(12) United States Patent
Garg et al.

(10) Patent No.: US 7,558,655 B2
(45) Date of Patent: Jul. 7, 2009

(54) PROGNOSTIC METHOD AND SYSTEM FOR HYBRID AND ELECTRIC VEHICLE COMPONENTS

(75) Inventors: Vijay Garg, Canton, MI (US); Joseph Fodera, Dearborn Heights, MI (US); Zheng Shen, Oviedo, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 922 days.

(21) Appl. No.: 10/711,319

(22) Filed: Sep. 10, 2004

(65) Prior Publication Data

US 2006/0058932 A1 Mar. 16, 2006

(51) Int. Cl.
*G06F 7/00* (2006.01)

(52) U.S. Cl. ............................. 701/29; 701/31; 701/35

(58) Field of Classification Search ............. 701/29–36, 701/99, 100; 340/438, 439; 307/9.1–10.8
See application file for complete search history.

(56) References Cited

U.S. PATENT DOCUMENTS

| | | | |
|---|---|---|---|
| 4,689,573 A | 8/1987 | Hilmer | |
| 5,530,360 A | 6/1996 | Kerchaert et al. | |
| 5,596,466 A | 1/1997 | Ochi | |
| 5,677,611 A | 10/1997 | Yoshihara et al. | |
| 5,757,645 A | 5/1998 | Schneider et al. | |
| 5,825,286 A | 10/1998 | Coulthard | |
| 6,119,074 A | 9/2000 | Sarangapani | |
| 6,145,107 A | 11/2000 | Farokhzad | |
| 6,175,787 B1 | 1/2001 | Breed | |
| 6,243,628 B1 | 6/2001 | Bliley et al. | |
| 6,326,758 B1 | 12/2001 | Discenzo | |
| 6,330,499 B1 | 12/2001 | Chou et al. | |
| 6,484,080 B2 | 11/2002 | Breed | |
| 7,164,117 B2 * | 1/2007 | Breed et al. ................. 250/221 |

FOREIGN PATENT DOCUMENTS

| | | |
|---|---|---|
| GB | 2 138 175 A | 10/1984 |
| GB | 2 212 638 A | 7/1989 |
| JP | 62-66167 A | 3/1987 |
| JP | 2000-301990 A | 10/2000 |
| WO | WO 2004/070924 A2 | 8/2004 |

* cited by examiner

*Primary Examiner*—Richard M. Camby
(74) *Attorney, Agent, or Firm*—David B. Kelley; Brooks Kushman P.C.

(57) ABSTRACT

A prognostic method and system for testing and controlling various hybrid, fuel cell, and electric vehicle components. The tests generate test data for determining a state of the tested components. An operating strategy of the vehicle is controlled based on the state of its tested components.

20 Claims, 3 Drawing Sheets

PROGNOSTIC METHOD AND SYSTEM FOR HYBRID AND ELECTRIC VEHICLE COMPONENTS

BACKGROUND OF THE INVENTION

1. Field of the Invention

The present invention relates to a prognostic system and method of testing and controlling vehicle components. It particularly relates to testing and determining an operating state of a vehicle component and controlling operation of the vehicle based on a prognosis of the operating state.

2. Background Art

U.S. Pat. No. 6,484,080 relates to a method and system for controlling vehicle operation based on an operating state of one or more of its components. The operating state is determined by monitoring various vehicle components and inputting signals related thereto into a pattern recognition system.

One problem with the method and system disclosed in the '080 patent is that its vehicle control elements cannot be prognostically tested. The method and system of the '080 patent is merely reactive. It records the operation characteristics of the components for comparison to predefined operational trends. Abnormal operation is determined, and corresponding vehicular control is undertaken, if the recorded operation differs from the predefined operational trends. The invention of the '080 patent fails to stress, probe, prompt, provoke or otherwise test the vehicle's components. Its reactive characteristic is unsuitable for testing the state of health of the components. It therefore is unsuitable for making a prognosis of an operation state of such tested components.

Another limitation of the invention of the '080 patent is that it is not suitable for control of hybrid, fuel cell, and electric vehicles. Increased demand of these types of vehicles presents control needs relating to their wide dynamic ranges of operation and diverse usage profiles. These characteristics are not found in powertrains with traditional internal combustion vehicles, such as those of the '080 patent.

A need exists in the art for a prognostic system and method for controlling hybrid vehicles, fuel cell vehicles and electric vehicles. The need extends to monitoring a state of the vehicle's components, and as power electronic modules, and to control operation of the vehicle based on a prognosis of the operating state of those components.

SUMMARY OF THE INVENTION

The present invention includes features for testing vehicle components and for controlling operation of the vehicle based on a prognosis of the state of health of the tested components, such as high efficiency, integrated, electronic power modules.

In practicing the present invention a test signal is provided to a vehicle component. The test signal causes the vehicle component to develop a response to the test signal. A prognosis of an operating state of the tested component is based, at least in part, on its response to the test signal. Vehicle operation can then be modified in accordance with the operating state of the tested component.

The modified vehicle operation can include implementing a limited operation strategy based, at least in part, on a degrading state for the tested component. The modified vehicle operation can include limiting operation or preventing further operation of a tested component or a component associated with the tested component. The modified vehicle operation can also include identifying a degrading state on an indicator. The indicator can be an alphanumeric display, a flashing light or the like.

One aspect of the present invention relates to testing a vehicle component by using a test signal to determine a forward-on voltage drop of the tested component. Another aspect of the present invention relates to testing a vehicle component by disabling at least one non-tested component and using a test signal to determine a leakage current in the tested component. Another aspect of the present invention relates to testing a component by providing a test signal to determine thermal impedance of the component. Another aspect of the present invention relates to testing a component by using a test signal to test for an AC impedance of the tested component. Another aspect of the present invention relates to testing a component by using a test signal to determine a calculation state of the tested component.

One advantage of the present invention is that response of the tested components to the test signals make it possible to predictively determine the state of the tested component. Another advantage of the present invention is that the states can be taken into account during execution of control strategies for controllers for powertrains in internal combustion engine powered vehicles, hybrid fuel cell vehicles and electric vehicles.

DETAILED DESCRIPTION OF THE PREFERRED EMBODIMENT(S)

Figure 1:
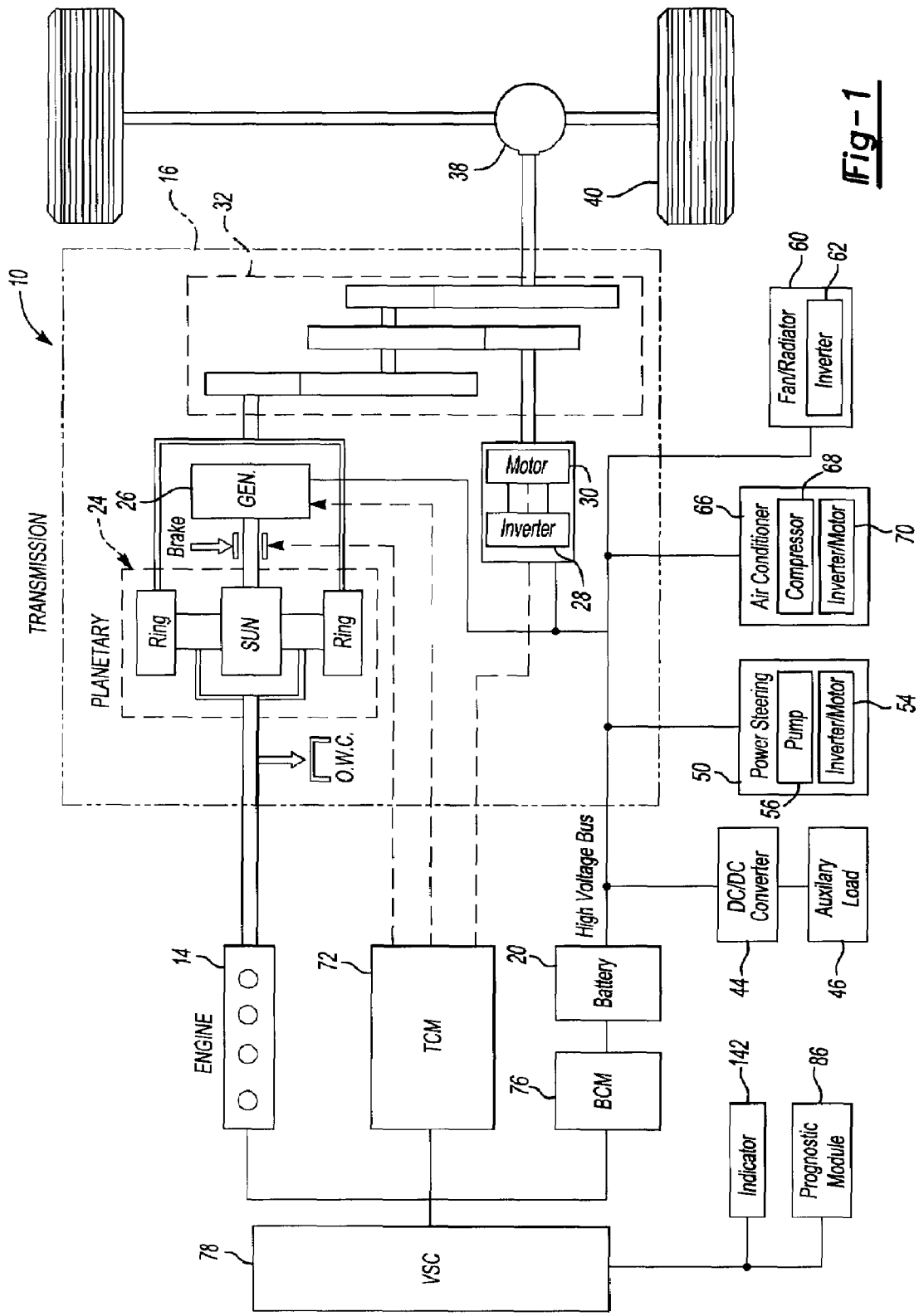
FIG. 1 illustrates a hybrid vehicle having a prognostic module in accordance with the present invention.

FIG. 1 illustrates an exemplary hybrid electric vehicle (HEV) 10 commonly referred to as parallel-series hybrid electric vehicle (PSHEV) 10. The present invention can be used, however, with any hybrid or non-hybrid system without deviating from the scope of the present invention, including vehicles powered by internal combustion engines, series hybrid electric vehicles (SHEV), parallel hybrid electric vehicles (PHEV), fuel cell vehicles (FIG. 4) and electric vehicles.

HEV 10 includes electrically operated or controlled components including engine 14, transmission 16, and battery 20. These components operate with planetary gear set 24, generator 26, inverter 28, motor 30, and countershaft gearing 32 for powering differential axle 38 and wheels 40. DC/DC converter 44 regulates power provided to auxiliary loads 46. Power steering unit 50 provides power steering of dirigible wheels, not shown. Power steering unit 50 includes pump 54 powered by inverter motor 56. Fan/radiator unit 60, which cools motor 30 and engine 14, is powered by inverter 62. Air conditioning unit 66, which provides cooling for a vehicle passenger compartment includes compressor 68 powered by inverter motor 70. Transmission control module 72 controls and monitors the torque output of engine 14 and motor 30. Battery control module 76 monitors and controls battery 20.

Vehicle system controller 78 (VSC) controls all aspect of vehicle operation. VSC 78 monitors vehicle operation and selects/controls HEV 10. VSC 78 generates and transmits signals to the vehicle components. The components operate as instructed by VSC 78. VSC 78 can control each component independently and collectively to control vehicle operation.

HEV 10 includes prognostic module 86. Prognostic module 86 generates test signals for testing various vehicle components. The test signals generate test data in the tested components that prognostic module 86 uses to diagnose a state of health of the tested component. That information is fed back to VSC 78. VSC 78 can control operation of HEV 10 based on the state of health of the tested component. Multiple components can be tested and diagnosed simultaneously.

Prognostic module 86 can be configured for operation with any vehicle component. The cost to configure prognostic module 86 is best offset if prognostic module 86 is configured for inverters and DC/DC converters, such as those described above. These electric components are both costly and important to vehicle reliability. It is desirable to accurately determine the states of such costly components so that vehicle operation can be controlled to limit their degradation.

Usage degradation can be problematic if allowed to be continued without some preventive measure. Commonly, especially in hybrid and electric vehicles, the high voltages received by these electronic components can begin a slow degradation of the components. The degradation may begin slowly and then increase in rate if the degrading component is not monitored and the degradating effects limited.

The present invention comprises a control strategy based on the monitored state of the tested component. The control strategy implements a limited operating strategy should one of the tested components begin to show degrading effects. The limited operating strategy permits HEV 10 to maintain varying levels of operation before shut-down. Shut-down is a last option as it can cause a substantial interruption to operation. Shut-down may be required to prevent permanent degradation to the tested component(s).

A degrading component is discovered during its monitored state. The monitored states are determined from the test data gathered by prognostic module 86 during testing. The monitored states are used to indicate whether the tested component shows indications of degradation.

The testing includes issuing test signals to the tested component and recording its response. The test signals are signals generated by prognostic module 86 and sent to the module being tested. The test signals are used to stress, probe, prompt, provoke, or otherwise test the component. The test signals sent to the tested component can be more beneficial in predicting degradation than merely recording a current operating state of the tested component.

Acceptable operation under normal conditions can mask a greater underlying problem. The greater problem relates to the degradation of a component and its continued viability. Many vehicle components degrade over time and such degradation is expected. Degradation that causes a problem is that which exceeds a planned degradation schedule. It is too late to take preventive measure against unscheduled degradation if the testing system merely records the current operating state of the component. The present invention overcomes this by testing the components in a predictive manner.

In one non-limiting aspect of the present invention, the test signals subject the tested component to operating conditions that the component would not typically experience. The test signal is transmitted/applied, for example, to test for a forward-on voltage of tested component. This is done by transmitting a preset current or voltage, or a combination of the two, to the tested component. The response of the tested component is determined by sensing its voltage drop.

According to another aspect of the present invention the test signal is transmitted/applied to test for a leakage current in the tested component. This is done by applying a preset current or voltage, or a combination of the two, to the tested component. The response of the tested component is determined by sensing its leakage current.

According to another aspect of the present invention the test signal is transmitted/applied to test for thermal impedance of the tested component. This is done by transmitting a preset current or voltage, or a combination of the two, with a power-pulse to the tested component. The response of the tested component is determined by measuring a change in temperature, such as a semi-conductor junction temperature or component case temperature or both.

According to another aspect of the present invention the test signal is transmitted/applied to test for an AC impedance of the tested component. This is done by transmitting a preset current or voltage, or a combination of the two, to the tested component. The response of the tested component is determined by sensing the impedance of the tested component.

The signals are known calibrating signals that produce predetermined responses of the tested component such that the degradation of the tested component can be determined.

The testing of the tested component can be done on any schedule, preferably at least at vehicle start-up and, optionally, periodically during vehicle operation. Testing at start-up may limit interference with other systems in HEV 10 or permit shutting down of these other systems. Periodic testing during vehicle operation may permit testing for specific conditions that would not otherwise appear during start-up. The testing can correspond with different vehicle operating conditions to effect differential testing.

The test signals can be generated and transmitted/applied to the tested module as necessary. The responses of the tested components are recorded. Recording includes data regarding the condition rules or vehicle state under which the test was conducted; i.e., whether the vehicle is in start-up or being driven. Prognostic module 86 can store data from a number of tests in a memory, along with the various parameters associated with the administration of the test signals, such as the driving conditions and the condition of other components in HEV 10. The responses to the test signal are stored by prognostic module 86 over time so that a history of responses can be kept and monitored.

Figure 2:
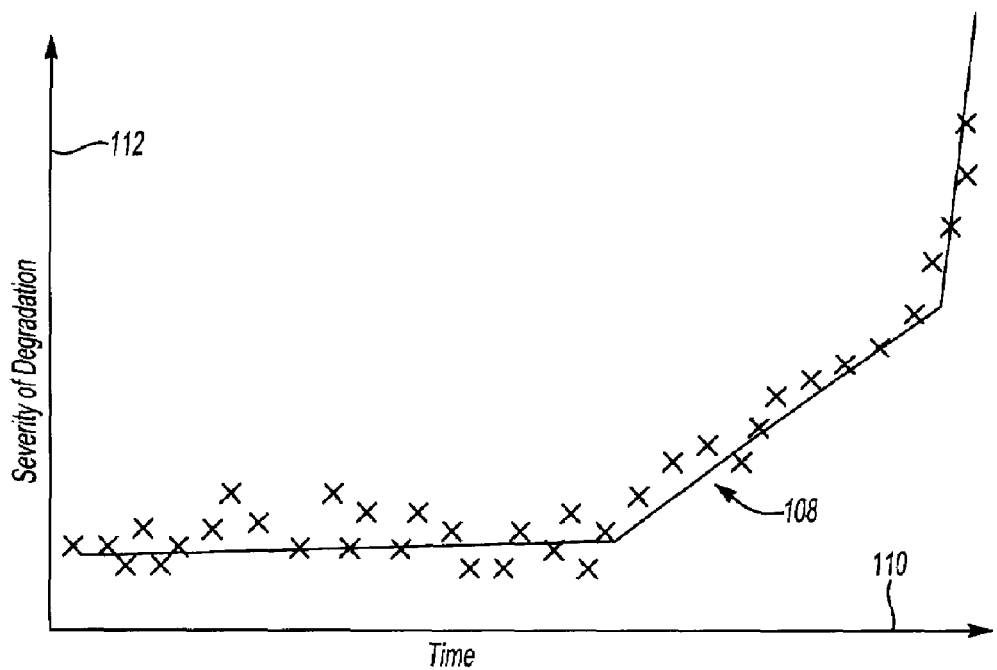
FIG. 2 illustrates a response trend for a tested component in accordance with the present invention.

FIG. 2 illustrates an exemplary response trend line 108 for one tested component. Response trend line 108 indicates on the ordinate 112 the responses of the tested component to a number of tests of the tested component over time indicated on axis 110. Trend line 104 represents the severity of the degradation of the tested response on a relative scale. A worsening degradation is shown with increased vertical spacing of the plotted data relative to abscissa 110.

Once a sufficient number of tests is recorded, analysis of the test responses can begin and a state of the tested component can be determined. This analysis can take a number of forms. In one case it can include an averaging and graphing of the tested responses. A slope of response trend 108 can be determined and used for subsequent comparison, and ultimately for obtaining a prognosis of the state of the tested component.

Figure 3:
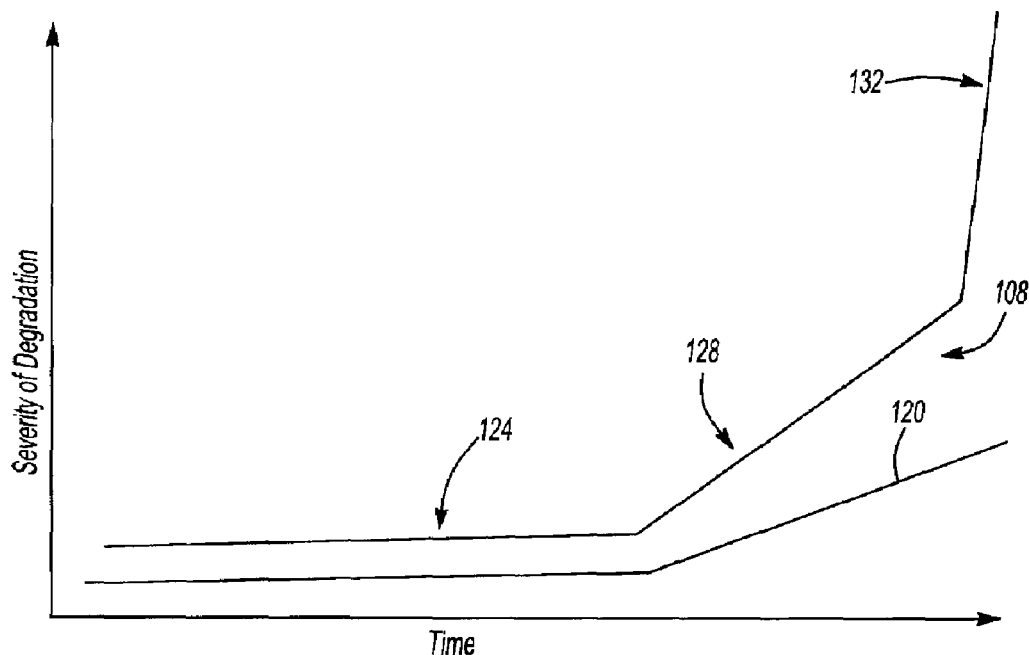
FIG. 3 illustrates a comparison of the response trend shown in FIG. 2 to a benchmark life expectancy trend in accordance with the present invention.

FIG. 3 illustrates a comparison of response trend 108 to a benchmark life expectancy trend 120. The comparison is used to diagnose the state of the tested component. Response trend 108 includes first portion 124, second portion 128, and third portion 132. First portion 124 is relatively flat with a slight upward slope to illustrate a slight worsening in the response to the test signal. The difference in slope between first portion 124 of response trend 108 and a corresponding portion of life expectancy trend 120 can be used to predict whether the degradation severity is such that the tested component is operating in a degrading state. The degrading state triggers a modification to vehicle operation.

The slight worsening of first portion 124, followed by more rapid worsening at second portion 128, can be interpreted as a warning sign that the tested component is beginning to degrade. If the degrading slope deviates more than a predetermined amount and life expectancy trend 120 does not increase at a corresponding rate, that will indicate that the tested components is beginning to degrade. The degrading of the tested component ideally matches the slope of life expectancy trend 120. An early warning can be provided to predict the degrading state of the tested component if the degrading slope deviates more than a predetermined amount.

If the beginning of the upward movement of second portion 128 occurs at approximately the same time as in the life expectancy trend 120, a degrading state would not be determined. If the trend rapidly increases with a much greater slope than life expectancy trend 120, such as in portion 128 or 132, the degrading state may be determined. Although the difference in slope between response trend 108 and life expectancy trend 120 may not be sufficiently large to indicate a degrading state, such as open entry into portion 132, a rapidly increasing slope of response trend 108 can provide a sufficient basis for determining the degrading state. The slope of response trend 108 may suddenly change so drastically that it would be impossible for such a change to take place unless there were some sort of inaccuracy with prognostic module 86. In this case, the inaccuracy of the prognostic module is determined, rather than determining the degrading state of the tested module.

Any number of parameters beyond differences in slope can be used to determine a degrading state. In addition, other parameters and computation means could be used without varying from the scope of the present invention.

Fuzzy logic and/or neural networks may be used to integrate results from the different test signals, and to make adjustments to the life expectancy process based on learned behavior of the tested component, which may not have been known at the time of determining life expectancy trend. Fuzzy logic and neural networks may also be use to integrate a condition determination with a modification to vehicle operation in order to provide a better understanding of whether the desired compensation is working as intended.

VSC 78 modifies vehicle operation if a degrading state is detected for the tested component. According to one non-limiting aspect of the present invention, the modified vehicle operation can include implementing a limited operating strategy for any number of vehicle controls. Preferably, the limiting operating strategy compensates for the degrading state of the tested component so that further degradation is limited as much as possible.

One modification to vehicle operation can include activation of an indicator when the degrading state of the tested component is detected. Indicator 142 can be used for this purpose. Indicator 142 can be an indicator light, such as an LED, or an alphanumeric display. When the degrading state is determined, the indicator can be turned on or the alphanumeric display can display a message describing the degrading state and, optionally, the corrective action needed.

Indicator 142 can also be controllable to communicate further degradation information in the event that the response trend continues to increase in slope, such as shown in third portion 132. Third portion 132 corresponds with severe degradation and a need to take immediate action. The severity can require vehicle shut-down. This can be communicated by flashing warning indicator 142 or changing to a flashing the alphanumeric display.

In addition to or in place of indicator 142, prognostic module 86 can communicate a signal to VSC 78 to take corrective action based on the degrading state of the component experiencing the degradation. Preferably, the corrective action can be based on the severity of the degradation. The corrective action can be proportional to the difference in value or slope between response trend 108 and life expectancy trend 120.

The degrading state may be determined with respect to inverter 28 in FIG. 1. VSC 78 can modify vehicle operation by controlling motor 30 to operate under limited power to limit further degradation of the inverter. If the diagnosed state is within second portion 128 (FIG. 3) of response trend 108 (FIG. 3), the degrading state may be compensated for by VSC 78 limiting power consumption of motor 30; i.e., by providing a limp-home function. If the degrading state of the inverter continues to increase, or is already determined to be operating within third portion 132, VSC 78 can prevent further operation of motor 30 and direct continued vehicle operation to be based solely on engine 14. This can be helpful to maintain continued vehicle operation until servicing can be obtained.

The degrading state may be determined with respect to inverter 56 used in power steering unit 50. VSC 78 can modify vehicle by limiting operation of power steering unit 50 to limit further degradation to inverter 56. The limited operation of power steering unit 50 can be a decrease in power steering assist levels and/or shut-down of power steering in favor of manual steering.

The degrading state may be determined with respect to inverter 70 used for powering an air conditioning unit 66. VSC 78 can limit operation of the air conditioning unit 66 to reduce further degradation to inverter 70. The limited operation of air conditioning unit 66 can be a decrease in cooling ability or shut-down of air conditioning unit 66.

The degrading state may be determined with respect to auxiliary DC/DC converter 44. VSC 78 can modify vehicle operation by limiting operation of the auxiliary DC/DC converter 44 to limit its further degradation. The limited operation of auxiliary DC/DC converter 44 can be a decrease in power supplied to auxiliary loads 46 or shut-down of all power supplied to auxiliary loads 46 based on prioritized auxiliary load strategy. In some cases, some operation must be maintained, such as maintaining lighting systems.

The degrading state may be determined with respect to inverter 62 used for powering fan/radiator unit 60. VSC 78 can modify vehicle operation by limiting operation of the fan/radiator unit 60 to limit further degradation to inverter 62. The limited operation of fan/radiator unit 60 can be a decrease in cooling operation or shut-down of all cooling. The shut-down of all cooling may further include shutting-down motor 30 or engine 14.

Figure 4:
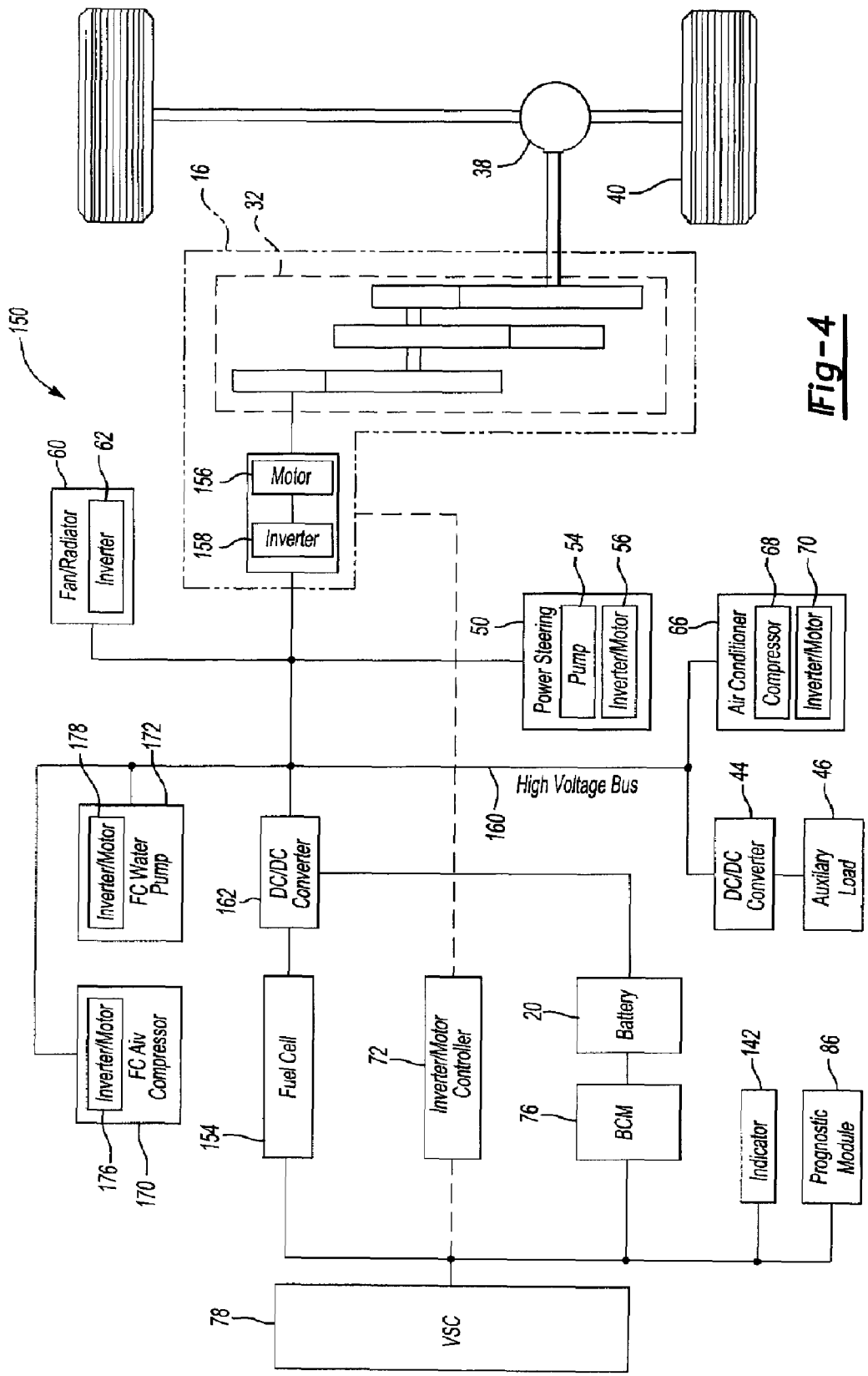
FIG. 4 illustrates a fuel cell vehicle having a prognostic module in accordance with the present invention.

FIG. 4 illustrates an exemplary fuel cell vehicle 150. The present invention includes modifying operation of the fuel cell vehicle 150 based on testing and monitoring a state of the fuel cell vehicle components. Fuel cell vehicles include components similar to those described above with respect to vehicles with internal combustion engines.

Fuel cell vehicle 150 operates in a manner similar to that described above with respect to HEV 10. The common features and operation are shown with the same reference numerals as those used above with respect to HEV 10. The modified operation of fuel cell vehicle 150 in response to determining a degrading state for one or more of the components is likewise controlled.

Unlike HEV 10, fuel cell vehicle 150 (FIG. 4) includes fuel cell 154 and a traction motor 156. Fuel cell 154 replaces engine 14, but it is similarly controlled by VSC 78. The traction motor 156, powered by inverter 158 and gearing 32, replaces planetary gear set 24 of FIG. 1 and is controlled by VSC 78. Inverter/Motor 156, 158 operates on power provide to high voltage bus 160. High voltage bus 160 receives power from DC/DC converter 162. DC/DC converter 162 receives power inputs from fuel cell 154 and high voltage battery 20. Fuel cell 154 further includes fuel cell air compressor 170 and water pump 172. Each includes respective inverter/motor combinations 176 and 178. Fuel cell air compressor 170 provides air to fuel cell 154. Fuel cell water pump 172 provides water to fuel cell 154.

A degrading state may be determined with respect to DC/DC converter 162. VSC 78 can modify vehicle operation by limiting operation of DC/DC converter 162 to limit its further degradation. The limited operation of DC/DC converter 162 can be a decrease in power output and/or vehicle shut-down.

A degrading state may be determined with respect to inverter 176, used for powering fuel cell air compressor 170. VSC 78 can modify vehicle operation by limiting operation of fuel cell 154 to limit further degradation to inverter 176. The limited operation of fuel cell 154 can be a decrease in power output or fuel cell 154 shut-down. The shut-down of fuel cell 154 provides a limp-home function as motor 156 can still be powered by power remaining in battery 20.

A degrading state may be determined with respect to inverter 178, used for powering fuel cell water pump 172. VSC 78 can modify vehicle operation by limiting operation of fuel cell 154 to limit further degradation to inverter 178. The limited operation of fuel cell 154 can be a decrease in power output of fuel cell or fuel cell 154 shut-down. The shut-down of fuel cell 154 provides a limp-home function as motor can still be powered by power remaining in battery 20.

A degrading state may be determined with respect to inverter 158 used for powering motor 156. VSC 78 can modify vehicle operation by limiting operation of motor 156 to limit further degradation to inverter 158. The limited operation of motor 156 can be a decrease in power output or shut-down.

Continued monitoring of the modified vehicle operation can occur by prognostic module 86 and VSC 78. This can include any number of operations. Preferably it can include further modification to vehicle operations, such as the modifications described above with respect to a flashing warning light, or it can prevent further operation of motor, based on whether the modified vehicle operation is executing the necessary correction of the degraded condition.

While the best mode for carrying out the invention has been described in detail, those familiar with the art to which this invention relates will recognize various alternative designs and embodiments for practicing the invention as defined by the following claims.

What is claimed is:

1. A method for operating a vehicle, the method comprising:
    applying a test signal to a vehicle electric power component;
    generating a response from the component;
    determining an operating state of the component based at least in part on the response to the signal;
    controlling vehicle operation based at least in part on the determined operating state of the component; and
    wherein determining the response includes developing a response trend based on a number of responses, comparing the response trend to a predefined trend, and determining the state of the component based in part on the comparison.

2. The method of claim 1, wherein controlling vehicle operation includes implementing a limited vehicle operating strategy based at least in part on detecting a degrading state for the component.

3. The method of claim 1, wherein controlling vehicle operation includes preventing further operation of the component.

4. The method of claim 1, wherein controlling vehicle operation includes indicating a degrading state of the component on a display.

5. The method of claim 1, wherein applying the test signal includes applying the signal to determine a forward-on voltage drop of the component.

6. The method of claim 1, wherein applying the test signal includes shutting off at least one other component and applying the signal to test for a leakage current in the component.

7. The method of claim 1, wherein applying the test signal includes applying the signal to determine a thermal impedance of the component.

8. The method of claim 1, wherein applying the test signal includes applying the signal to determine an AC impedance of the component.

9. The method of claim 1, wherein the state of the component indicates a need to limit degradation if the response trend differs from the predefined trend by a predefined margin.

10. The method of claim 1, wherein the vehicle includes an inverter for powering a motor and the component is the inverter, and wherein controlling vehicle operation includes limiting operation of the motor if the diagnosed state of the inverter indicates the inverter is degrading.

11. The method of claim 1, wherein the vehicle includes an inverter for powering a power steering unit and the component is the inverter, wherein controlling vehicle operating includes limiting operation of the power steering unit if the determined state of the inverter indicates the inverter is degrading.

12. The method of claim 1, wherein the vehicle includes an inverter for powering an air conditioning unit and the component is the inverter, and wherein controlling vehicle operation includes limiting operation of the air conditioning unit if the diagnosed state of the inverter indicates the inverter is degrading.

13. The method of claim 1, wherein the vehicle includes an auxiliary DC/DC converter and the component is the auxiliary DC/DC converter, wherein controlling vehicle operating includes limiting operation of the auxiliary DC/DC converter if the determined state of the auxiliary DC/DC converter indicates the auxiliary DC/DC converter is degrading.

14. The method of claim 1, wherein the vehicle includes an inverter for powering a fan/radiator unit and the component is the inverter, and wherein controlling vehicle operation includes limiting operation of the fan/radiator unit if the determined state of the inverter indicates the inverter is degrading.

15. A system for controlling operation of an electronic power component of a vehicle based at least in part on a determined state of the vehicle component, the system comprising:
    a prognostic module to diagnose the state of the vehicle component by providing a test signal thereto and determining a degrading state of the tested component based at least in part on a response of the tested component to the test signal if the determined state is degrading faster than a predefined degradation rate; and
    a vehicle system controller for controlling operation of the vehicle, the vehicle system controller being operable with the prognostic module to limit vehicle operation in response to detection of a degrading state of the tested component.

16. The system of claim 15 wherein the prognostic module test one of an inverter and a DC/DC converter.

17. A method of limiting degradation of an electrically-driven vehicle system, the method comprising:
   applying a test signal to the vehicle system;
   sensing a response of the vehicle system to the test signal; and
   reducing operating demands on the vehicle system if the response indicates an operating capability of the vehicle system has degraded since a previous application of the test signal.

18. The method of claim 17 further comprising applying the test signal to the vehicle system when the vehicle system is inactive.

19. The method of claim 17 further comprising applying the test signal to the vehicle system when the vehicle system is active.

20. The method of claim 17 wherein the vehicle system includes a power input and a control input, wherein the method further comprises applying the test signal to the power input.

* * * * *